Patented May 13, 1952

2,596,150

UNITED STATES PATENT OFFICE 2,596,150

PICKLING BATH FOR METALS

William H. Hill, Pittsburgh, Pa., and Dorothy Kibler Shipley, Baltimore, Md., assignors to Koppers Company, Inc., Pittsburgh, Pa., a corporation of Delaware No Drawing. Application February 21, 1945, Serial No. 579,168

4 Claims. (Cl. 252—149)

1

The present invention relates to novel compositions and methods for the cleaning or pickling of metals and is particularly directed to such compositions and methods as contain or use as an active pickling inhibitor a condensation product of orthomethyl-cyclohexanone and thiourea or ammonium thiocyanate, said condensation product having a constitution and a molecular weight corresponding to two mols of the ketone and one mol of the thiourea or ammonium thiocyanate less two mols of water.

The ortho-methyl-cyclohexanone condensation product of this invention is suitably prepared by charging ortho-methyl-cyclohexanone and ammonium thiocyanate (or thiourea) in the molar ratio of 1 mol of ammonium thiocyanate for each 2 mols of ortho-methyl-cyclohexanone plus 10 per cent excess of the ketone into a three neck flask fitted with a Dean Stark water trap such as is used in the quantitative determination of moisture in hydrocarbon or oil samples. To this trap is attached a water-jacketed condenser. The other two necks of the flask are fitted respectively with a stopper and a thermometer reaching to the bottom of the flask. The flask is heated by an oil bath and the reaction mixture is heated with quiet reflux (temperature 134–142° C.) until the calculated quantity of water is collected in the water trap. The reaction product is then purified by washing with ether and treating with hot ethyl alcohol. This yields a reasonably purified material having a melting point of 189–193° C. On further recrystallization a single purified product is isolated as cream colored crystals melting at 214–216° C. with an analysis of sulfur 12.2 calculated, 12.5 found, nitrogen 10.6 calculated, 10.8 found.

According to results obtained in small scale pickling tests the condensation product thus prepared was found to give the maximum corrosion inhibition under test conditions, with the cyclohexanone-ammonium thiocyanate condensation product taking second place. Similar reasonably purified condensation products were tested in large scale tests against commercial inhibitors in 5% (by volume) and 8.74% (by weight) sulphuric acid at 180° F. Loss in weight of test plates are reported in the following tabulations in ounces per square foot of surface after the tabulated test period in minutes.

2

Test Inhibitor—Condensation product of ortho-methylcyclohexanone and $NH_4SCN$ (M. P. 189°–193° C.)
Test Plate—Open hearth plate.

| Inhibitor Concentration Percent of Acid Weight | Loss in Weight in Ounces per Square Ft. After: | | | |
|---|---|---|---|---|
| | 10 Min. | 20 Min. | 30 Min. | 30 Min. (Commercial Inhibitor) |
| .10 | .003 | .005 | .006 | |
| .20 | .002 | .004 | .005 | |
| .30 | .002 | .003 | .004 | |
| .40 | .001 | .002 | .003 | .006 |
| .50 | .001 | .002 | .003 | .004 |

Test Inhibitor—Condensation product of ortho-methylcyclohexanone and $NH_4SCN$ (M. P. 189°–193° C.)
Test Plate—Bessemer Plate.

| Inhibitor Concentration Percent of Acid Weight | Loss in Weight in Ounces per Square Ft. After: | | | |
|---|---|---|---|---|
| | 10 Min. | 20 Min. | 30 Min. | 30 Min. (Commercial Inhibitor) |
| .10 | .012 | .018 | .025 | |
| .20 | .005 | .010 | .014 | |
| .30 | .004 | .008 | .012 | |
| .40 | .003 | .006 | .009 | .055 |
| .50 | .004 | .008 | .011 | .042 |

Test Inhibitor—Condensation product of cyclohexanone and $NH_4SCN$ (M. P. 217°–225° C.)
Test Plate—Open hearth plate (low phosphorus).

| Inhibitor Concentration Percent of Acid Weight | Loss in Weight in Ounces per Square Ft. After: | | | |
|---|---|---|---|---|
| | 10 Min. | 20 Min. | 30 Min. | 30 Min. (Commercial Inhibitor) |
| .10 | .018 | .029 | .040 | |
| .20 | .006 | .008 | .010 | |
| .30 | .004 | .005 | .006 | |
| .40 | .004 | .005 | .006 | .006 to .009 |
| .50 | .004 | .004 | .005 | .004 to .006 |

The effectiveness of the ortho-methylcyclohexanone-ammonium thiocyanate condensation product was found to be nearly a maximum at a concentration of 0.10% by weight of the acid on open-hearth steel and 0.20% by weight of the acid on Bessemer steel. These concentrations are very low, being approximately one-half the concentrations required with available commercial inhibitors. The cyclohexanone-ammonium thiocyanate condensation product was found to be comparable with a good commercial inhibitor for open hearth plate (low phosphorus).

We claim:

1. In the cleaning or pickling of metals, the method of protecting the metallic surface against undesirable dissolution by the pickling acid solution which comprises incorporating in the pickling acid solution an inhibiting amount of a condensation product of ortho-methyl cyclohexanone and a compound selected from the class consisting of ammonium thiocyanate, and thiourea, said condensation product having a constitution and a molecular weight corresponding to 2 mols of said ketone and 1 mol of said compound less 2 mols of water.

2. The method of claim 1 in which the said compound is ammonium thiocyanate.

3. A pickling bath for the cleaning and pickling of metals, comprising a pickling acid solution having incorporated therein an inhibiting amount of a condensation product of ortho-methyl cyclohexanone and a compound selected from the class consisting of ammonium thiocyanate, and thiourea, said condensation product having a constitution and a molecular weight corresponding to 2 mols of said ketone and 1 mol of said compound less 2 mols of water.

4. The pickling bath of claim 3 in which said compound is ammonium thiocyanate.

WILLIAM H. HILL.
DOROTHY KIBLER SHIPLEY.

REFERENCES CITED

The following references are of record in the file of this patent:

UNITED STATES PATENTS

| Number | Name | Date |
|---|---|---|
| 2,131,790 | Ter Horst | Oct. 4, 1938 |
| 2,201,488 | Harman | May 21, 1940 |
| 2,271,400 | Pinkney | Jan. 27, 1942 |
| 2,295,563 | D'Alelio | Sept. 15, 1942 |
| 2,356,710 | Stiteler | Aug. 22, 1944 |

FOREIGN PATENTS

| Number | Country | Date |
|---|---|---|
| 559,890 | Great Britain | Mar. 9, 1944 |

OTHER REFERENCES

Comprehensive Treatise of Inorganic and Theoretical Chemistry, Mellor, vol. VI, pg. 116.